United States Patent [19]
Kraemer et al.

[11] Patent Number: 5,454,095
[45] Date of Patent: Sep. 26, 1995

[54] MULTI-PROCESSOR SYSTEM IN WHICH AT LEAST TWO PROCESSORS ACCESS THE SAME MEMORY

[75] Inventors: Rolf Kraemer, Schwieberdingen; Herbert Graft, Dornstetten-Hallwangen, both of Germany

[73] Assignee: Robert Bosch GmbH, Stuttgart, Germany

[21] Appl. No.: 222,505

[22] Filed: Apr. 5, 1994

Related U.S. Application Data

[63] Continuation of Ser. No. 822,703, Jan. 21, 1992, abandoned.

[30] Foreign Application Priority Data

Jan. 28, 1991 [DE] Germany ............... 41 02 390.0
Sep. 7, 1991 [DE] Germany ............... 41 29 809.8

[51] Int. Cl.$^6$ ............... G06F 12/00; G06F 15/163
[52] U.S. Cl. ............... 364/431.05; 364/961.3; 364/242.5; 395/477; 395/495; 395/200.08
[58] Field of Search ............... 395/200, 250, 395/425, 800; 364/431.04, 431.05, 431.12, 442

[56] References Cited

U.S. PATENT DOCUMENTS

| | | | |
|---|---|---|---|
| 4,164,787 | 8/1979 | Aranguren | 395/425 |
| 4,432,430 | 2/1984 | Lind | 180/197 |
| 4,443,846 | 4/1984 | Adcock | 395/325 |
| 4,603,383 | 7/1986 | Tanaka et al. | 395/250 |
| 4,876,664 | 10/1989 | Bittorf | 395/200 |
| 4,894,797 | 1/1990 | Walp | 395/425 |

*Primary Examiner*—David Y. Eng
*Attorney, Agent, or Firm*—Kenyon & Kenyon

[57] ABSTRACT

A multi-processor system that is useful for controlling processes of motor vehicles. The system having at least two processors that jointly access the same memory. The system memory is divided into at least two sectors. A first processor accesses one memory sector only in the read mode and a second processor accesses it only in the write mode. The second processor accesses the other memory sector only in the read mode and the first processor accesses it only in the write mode. The processors are synchronized in such a way that the processors access the memory in the same way at the same time.

19 Claims, 3 Drawing Sheets

MULTI-PROCESSOR SYSTEM IN WHICH AT LEAST TWO PROCESSORS ACCESS THE SAME MEMORY

This is a continuation of application Ser. No. 07/822,703 filed on Jan. 21, 1992 now abandoned.

FIELD OF THE INVENTION

The present invention relates to a multi-processor system, and in particular to a multi-processor system which may be used in the control and regulation of motor vehicles in which two or more processors access the same memory.

BACKGROUND INFORMATION

In the control and regulation of motor vehicles, various regulation and control tasks are usually divided among several processors. When several processors are present, in many cases at least two processors jointly access the same memory.

Difficulties occur if different processors access the same memory cell at the same time. In order to prevent this, complicated measures are taken to ensure that more than one processor do not access the same memory cell at the same time.

Objects of the present invention include, but are not limited to, ensuring the reliability of data transmission between processors, minimizing delays due to data exchange between processors, and optimizing the operating time burden on individual processors as well as the overall system when different processors access the same memory.

SUMMARY OF THE INVENTION

The present invention is directed to a multi-processor system in which at least two processors access the same memory. The memory of the system is divided into at least two sectors. A first processor accesses one memory sector only in the read mode and a second processor accesses it only in the write mode. The second processor accesses another memory sector only in the read mode and the first processor accesses it only in the write mode. The processors are synchronized in such a way that the processors access the memory in the same way at the same time.

The multi-processor system according to the present invention does not need access regulation. In other words, no measures are required to regulate the access of the individual processors to the memory means. By synchronization of the processors, each processor is informed about the functions being performed by the other processors at that particular time. Furthermore, according to the system of the present invention, individual calculations can take place in any desired processor since all the data is available to all the processors almost simultaneously. Therefore, it is not necessary for a processor, which is connected to a sensor, to evaluate the signals from that sensor because this evaluation can be taken over by any other processor since the information is available to all processors. This process ensures that the capacities of all the processors are utilized uniformly.

DETAILED DESCRIPTION

Figure 1:
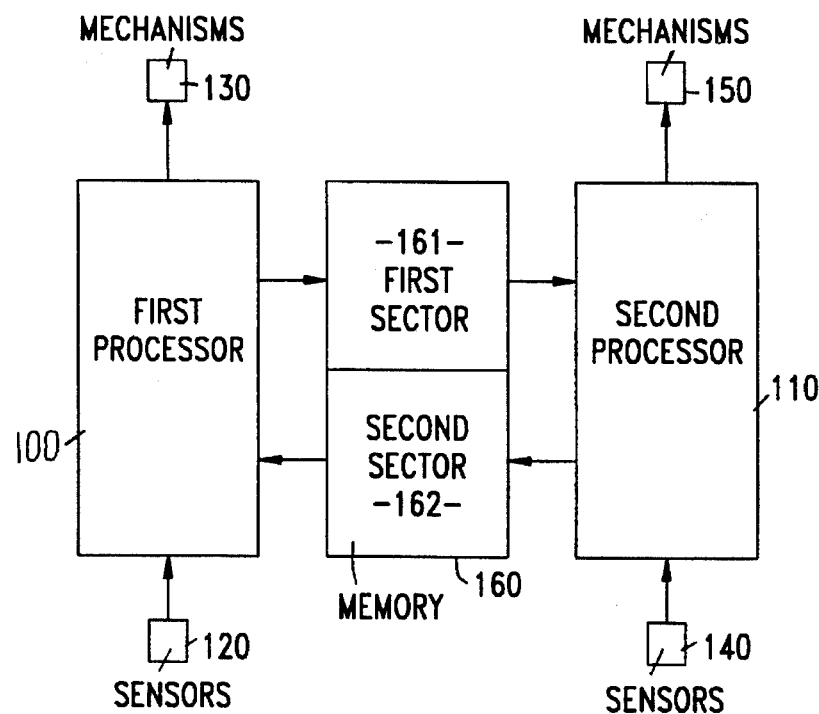
FIG. 1 is a block diagram of a multi-processor system having two processors.

FIG. 1 is a block diagram of the multi-processor system of the present invention that has two processors. The first processor 100 receives signals passed to it from various sensors 120, and in turn sends signals to various mechanisms 130. The second processor 110 receives signals from various sensors 140 and sends signals to various mechanisms 150. The two processors 100 and 110 are connected via memory means 160. The memory 160 is divided into two sectors 161 and 162. The first sector 161 permits data transfer from the first processor 100 to the second processor 110. The second sector 162 permits data transfer from the second processor 110 to the first processor 100.

In the case of an internal combustion engine with auto-ignition, the master processor preferably calculates a signal which represents the amount of fuel to be injected. This control signal (amount of fuel signal) is sent to a mechanism which determines the amount of fuel to be injected. The calculation of the amount of fuel to be injected in this case takes place independently of the output signal of an rpm sensor or other sensors.

In this scenario, the first processor 100 can be designated as a master processor which calculates a signal which represents the amount of fuel to be injected and the second processor 110 may control the calculation of the start of injection of the fuel. In performing its functions, the second processor sends the signal that it calculates "to start injection" to a corresponding mechanism. In this case, the second processor 110 also processes at least the output signal of an rpm sensor.

The present invention is not limited to the control of internal combustion diesel engines, it can also be applied to other control and regulation processes. In an internal combustion engine with spark ignition, one processor can take over the determination of the control signals for the throttle valve setter, and another can take over the determination of the time of ignition or the injection amount. Furthermore, it is possible that the processors exercise functions such as transmission control, anti-lock protection, exhaust gas recycling, or boost pressure regulation.

If the second processor 110 fails, the first processor 100 can take over part of its functions. In this event, the ability of the first processor 100 to perform the functions of the calculations of fuel amount and start of injection is limited. This means that emergency operation is possible, even though capabilities are limited. In case of failure of the first processor 100, the second processor 110 also takes over the functions of the first processor to a limited extent. For either of these situations, it is necessary that both processors be able to access the mechanism being controlled by the other in each instance.

However, the method according to the present invention is not limited to such an embodiment. It can also be provided that the one processor is connected only with sensors, and that this processor be tasked to evaluate the signals supplied by these sensors. The other processor is then connected with the mechanisms and calculate the control signals for these mechanisms, based on the values determined by the first processor.

For data transmission, both processors are connected to the memory 160. Memory 160 may be a DPRAM (Dual Port Random Access Memory). Such a DPRAM has two connections or bus connections. It can therefore be connected with two processors. This makes it possible for two processors to access it.

According to the invention, the memory 160 is divided into two sectors 161 and 162. The first processor can access the first sector 161 only in the write mode. In other words, the first processor 100 can only write values into this sector. The second processor 110, in contrast, can only access this sector 161 in the read mode. Therefore, the second processor 110 can only read data out of this sector 161. The sector 161 therefore serves for data transfer from the first processor 100 to the second processor 110. The second sector 162, in contrast, serves for data transfer from the second processor 110 to the first processor 100. In other words, the first processor 100 can only read from the second sector 162 in the read mode, and the second processor 110 can only write to it.

In this manner, it can be ensured that neither processor accesses a memory cell at the same time. In known systems, this is ensured by means of complicated measures using circuit technology, or by other complicated procedures.

The multi-processor system according to the invention accomplishes this in the following manner. Both processors work synchronously, which means that both processors carry out their corresponding functions at the same time. Further, this means that both processors access the memory 160 in the read mode at the same time. Since the first processor 100 only reads values out of the second sector 162, and the second processor 110 only reads values from the first sector 161, there are no access problems. The same holds true for access in the write mode.

Figure 3:
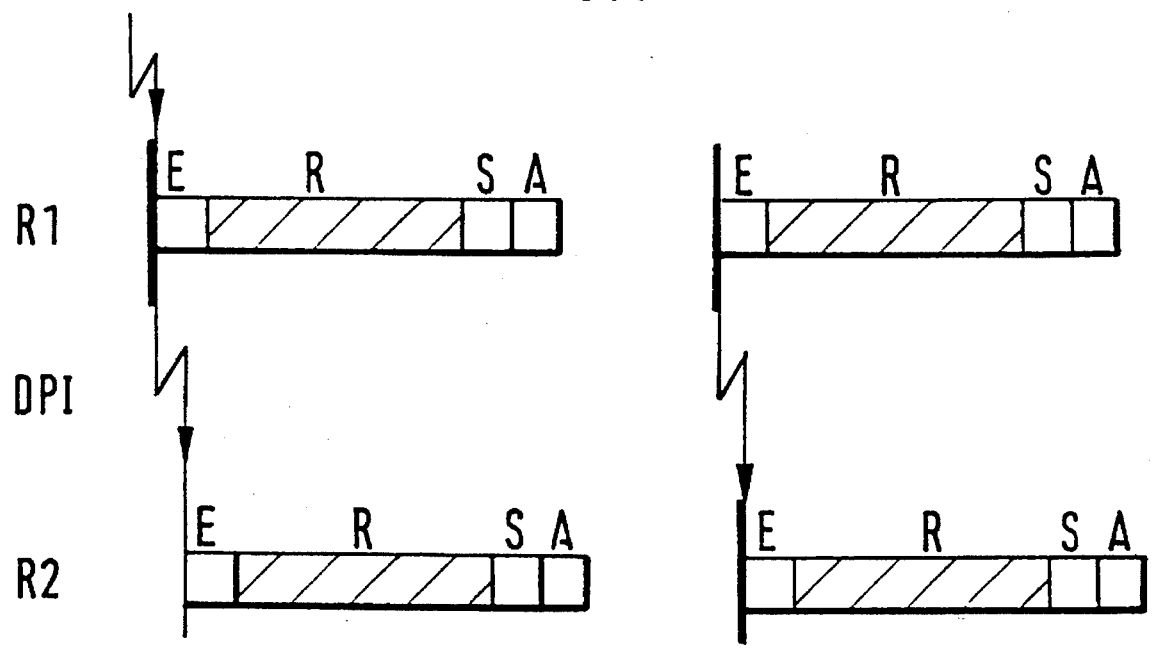
FIG. 3 is a timing diagram for the embodiment of the present invention shown in FIG. 1 with two processors.

The details of this synchronization are explained more fully on the basis of the diagram of FIG. 3, in conjunction with FIG. 1. Usually, one processor is designated as the master processor. In this embodiment, this is the first processor R1 (FIG. 3), which corresponds to first processor 100 of FIG. 1. After an interrupt reaches the first processor R1 from outside, it begins a predetermined function sequence. At the same time, it issues an interrupt, DPI, to the second processor R2 (FIG. 3), which corresponds to second processor 110 of FIG. 1. Upon receiving this interrupt, the second processor R2 also begins the predetermined function sequence.

The interrupt sent to the first processor R1 can either be time-oriented or event-oriented. Thus, the interrupt can be sent at equal time intervals by means of a pre-set cycle frequency. However, it may be advantageous if the interrupt is triggered on an event-oriented basis. This means that the interrupt is triggered if a certain event occurs. Such an event, for example, is the occurrence of an rpm impulse.

After the occurrence of an interrupt, both processors start with the same preset function sequence. During a first time period E, the data from the memory 160 are read into the processor in question (read-in function). During a second time period R, the processors calculate certain values on the basis of these data (calculate function). During a time period S which follows this, sensor signals are acquired. Subsequent to this, during the time period A, the calculated values and the acquired sensor signals are read out into the memory 160 (read-out function).

After a certain time period, a renewed interrupt then occurs for the first processor R1, which again passes this interrupt, DPI, on to the second processor R2. The two processors thereupon work through the individual functions.

As the diagram shows, the two processors R1 and R2 access the memory 160 only in the read mode during a first time period E. Only during a subsequent time period A do the two processors access the memory in the write mode. The two functions read-in and read-out are separated by the calculate function. This separation guarantees that access to a memory sector does not occur simultaneously in the write mode and in the read mode.

Because the sensor values are acquired just before output of the values into the memory, these values are available to both processors. This ensures that a processor also has values from a sensor with which it is not directly connected. Thus, the values of the sensors 140 are available to the first processor 100.

At each interrupt, the same values are available to all the processors after read-in of the memory contents. This makes it possible for the individual calculations to be divided evenly among the processors. Thus, the processor R1, which actually calculates only the fuel amount, can also take over tasks of the processor R2. This ensures uniform capacity utilization of the two processors. The individual calculations may be carried out in any desired processor. For example, the processor R1 can carry out calculations for signals for controlling the mechanism 150, which are actually assigned to the second processor, and are based upon the values from the sensors 140. This offers the advantage, among other things, that processors with good mathematical properties can be coupled with processors which demonstrate good input/output behavior.

Figure 2:
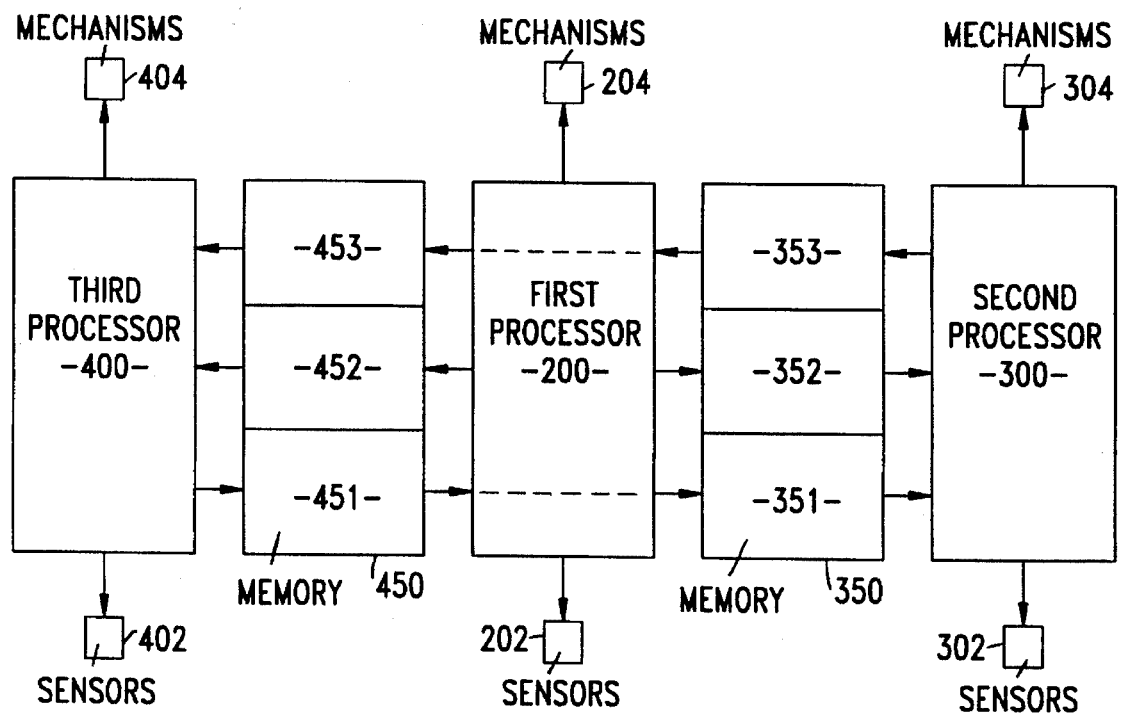
FIG. 2 is a block diagram of a multi-processor system having three processors.

FIG. 2 is a block diagram of the system of the present invention that has three-processors. The first processor 200 acquires input signals of various sensors 202 and sends control signals to various mechanisms 204. The second processor 300 acquires signals from the sensors 302 and sends signals to the mechanisms 304. The third processor 400 acquires signals from the sensors 402 and sends signals to the mechanisms 404.

The first processor 200 and second processor 300 are each connected with the memory 350. This memory is preferably divided into three sectors. The second processor 300 can access the first sector 351 and the second sector 352 only in the read mode. In contrast, it can access the third memory sector 353 only in the write mode. The first processor 200 can access the first sector 351 and second sector 352 only in the write mode, and the third memory sector 353 only in the read mode.

The first processor 200 and third processor 400 are each connected with the memory 450. This memory is preferably divided into three sectors. The third processor 400 accesses the first memory sector 451 of the memory 450 only in the write mode, and the first processor 200 accesses it only in the read mode. The first processor 200 accesses the second memory sector 452 and third memory sector 453 only in the write mode, while the third processor 400 accesses them only in the read mode.

The broken line indicates that in the first memory sector 351 of the memory 350, the first processor 200 reads in data which it has received from the third processor 400. Furthermore, it is indicated by the other broken line that in the third memory sector 453 of the memory 450, the first processor 200 reads in those data which it has received from the second processor 300.

According to the system of present invention with the three-processors, it is advantageous, though not required, that the first processor 200 take over calculation of the control signals for the mechanisms. The second processor 300 then take over the calculation of the basic data (fuel amount signal, start injection signal) for the first processor 200. The capacities of the third processor 400 are utilized for input and output of different values of various sensors.

Figure 4:
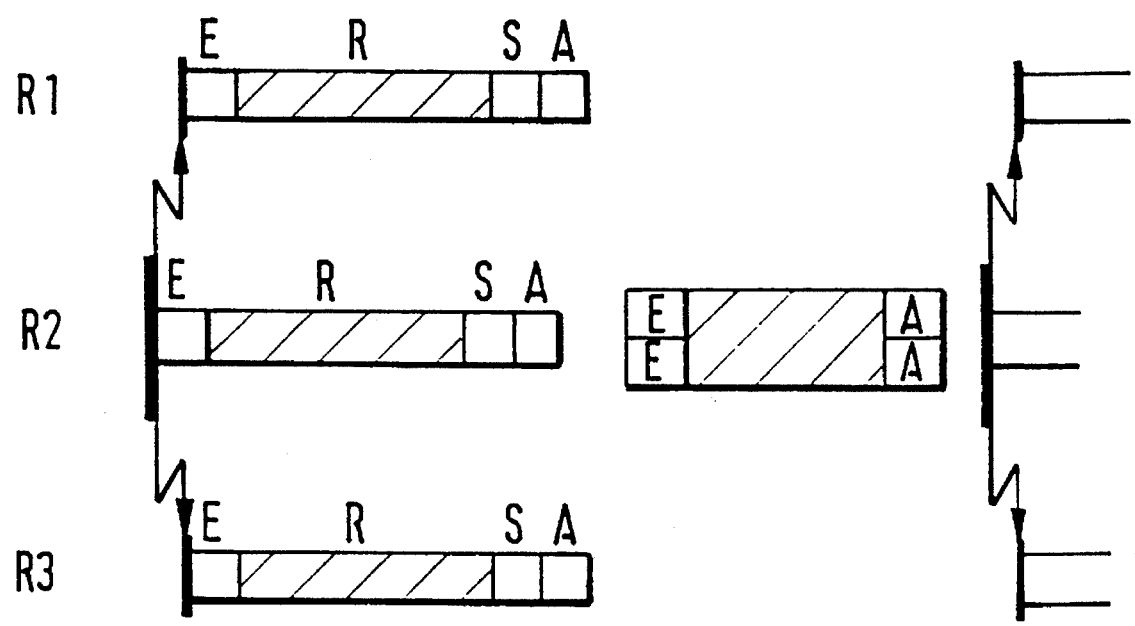
FIG. 4 is a timing diagram for the embodiment of the present invention shown in FIG. 2 with three processors.

FIG. 4 shows a timing diagram for various function sequences of the system of the present invention shown in FIG. 2. In the embodiment of the present invention shown in FIG. 4 as now depicted through the timing diagram of FIG. 2, the first processor R2 (which corresponds to first processor 200 of FIG. 2) is the master processor. If it receives an event-oriented or time-oriented trigger impulse from outside, it passes an interrupt signal on to the second processor R1 (which corresponds to second processor 300 of FIG. 2) and the third processor R3 (which corresponds to the third processor 400 of FIG. 2). After the interrupt, all three processors start with the function E, read-in data from the DPRAM memories. After read-in of the data, various values are calculated on the basis of this data. This period is designated as R in the timing diagram. Subsequent to this, the values from various sensors are read in, during a further period S.

The individual processors read in the values of the sensors directly connected to them. It is not necessary in this connection scheme that all processors are connected with sensors. It is certainly possible that only one processor, for example the third processor 400, is connected with sensors. In this case, this function is eliminated at the other processors. Subsequently, the data is read out from the memory DPRAM (function A). This means that the data is written into the DPRAM.

The first processor 200 reads (function E) the data out of the memory sector 353 of the memory 350 and the memory sector 451 of the memory 450. The second processor 300 reads the data out of the memory sectors 351, 352 and the third processor 400 reads the data out of the memory sector 453 and 452. During the function read-in, E, all the processors therefore access different memory sectors. Only one processor accesses each memory sector. During the function A (writing to memory), during which the individual memory sectors are written to, the first processor 200 writes to the memory sector 352 and the memory sector 452. The third processor writes to the memory sector 451, and the second processor writes to the memory sector 353.

This function sequence is followed by another function sequence, in which only the master processor (first processor 200) is active. Now the data which the second processor 300 has read into the memory 350 are only available to the second processor 300 and first processor 200. The third processor 400 cannot yet access the data of the second processor, and vice versa. Therefore, it is necessary that the first processor 200 writes the data of the second processor 300 into the memory 450 and the data of the third processor 400 into the memory 350, in a further function sequence.

The first processor 200 reads values out of the memory sector 353 and into the memory sector 451. Thus, read access to the DPRAM takes place. After a possible calculation step, it writes the data which it has read in from the memory 350 into the memory sector 453. It writes the values which it has read out of memory sector 451 into the memory sector 351. Thus, write access to the memory DPRAM 351 takes place. This method of procedure guarantees that after the next read-in of data into the processors, all the data will be available to all the processors.

The method of procedure described is not limited to systems with two and three processors. This method of procedure can be especially advantageously expanded to processor systems with more than three processors. The function sequence that the processor first access the memory in the read mode and then in the write mode is not absolutely necessary. It can be advantageous to access the memory first in the write mode and then in the read mode.

Usually, memory modules which have a memory capacity of more than 2 kbytes are used as DPRAMs. For the task described above with regard to data exchange, only half a kbyte of memory capacity is required. According to the present invention, the memory sectors of the DPRAM which are not required for data exchange may be used as external RAM for the microprocessors. This means that external RAM modules are not required. This also means a savings in costs and circuit board space. Furthermore, the reliability is greater and the susceptibility to breakdown is less, since the number of modules and the connection points are less.

Figure 5:
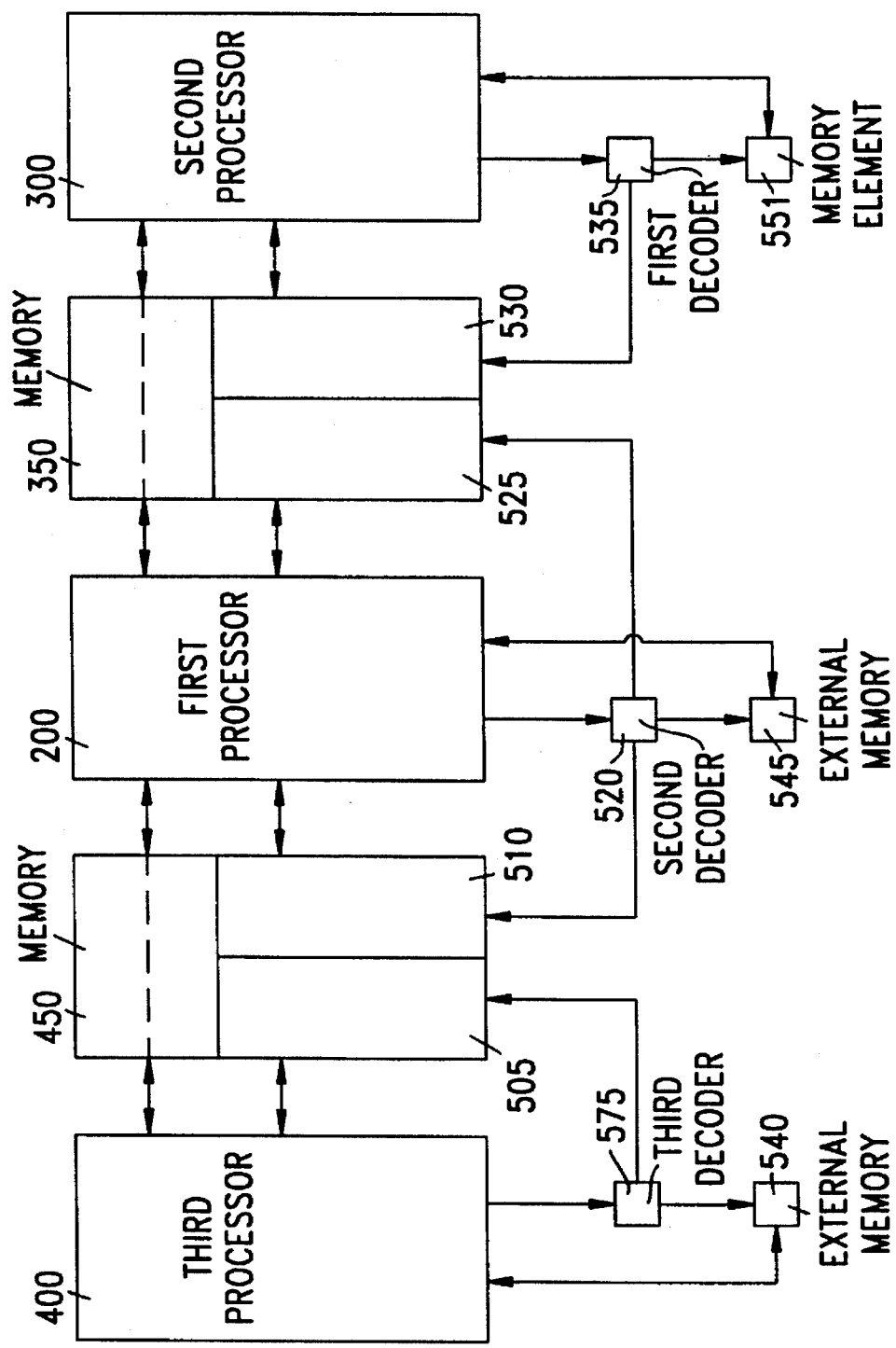
FIG. 5 shows sectored memories incorporated in the system of the present invention with sections that are not needed for data exchange and can be used for other purposes.

Referring to FIG. 5, another embodiment of the system according to the present invention will be explained in greater detail. The system according to FIG. 5 essentially corresponds to the embodiment according to FIG. 2. Thus, the corresponding components are also designated with the same reference numbers. The sensors 402, 202 and 302 as well as the mechanisms 304, 204 and 404 have been left out, in order to increase the clarity of the illustration.

The first processor 200 is connected with the second processor 300 via the memory 350. Furthermore, the first processor 200 is connected with the third processor 400 via the memory 450. The memory 350 is divided into three sectors. The first sector corresponds to the sectors 351, 352 and 353 described in FIG. 2, which are required for data exchange between the processors. The memory sector not required for data exchange is divided into two further parts 525 and 530. Only the second processor 300 accesses the memory sector 530. For this, a first decoder 535 generates a corresponding control signal. The first decoder 535 can also access another memory element 551. Data is read out of the memory sector 530 and the memory element 551, or written into them, as a function of the output signals of the decoder 535.

The second part 525 of the memory 350 can be accessed by a second decoder 520. The first processor 200 applies corresponding signals to the decoder 520. Furthermore, the decoder 520 can also access the memory sector 510 of the memory 450. In addition, the second decoder 520 controls an external memory 545. The processor 200 can read data out of the memory sector 525, the memory sector 510, and the memory element 545, or write to them, as a function of the output signals of the decoder 520.

A third decoder 515, to which signals are applied by the third processor 400, controls the memory sector 505 of the memory 450, as well as the external memory 540. Data is read out of the memory sector 505 and the memory element 540, or written to them, by the processor 400, as a function of the output signals of the decoder 515.

As this embodiment shows, each processor has an external memory 540, 545 and 551 assigned to it. Furthermore, the second processor 300 can access the memory sector 530 of the memory 350, the first processor 200 can access the memory sector 525 of the memory 350 and the memory sector 510 of the memory 450. The third processor 400 can access the memory sector 505 of the memory 450.

Particularly advantageous variations provide that it might be possible to do without external memory 540, 545 or 551 entirely. It can also be provided that only one processor accesses a memory in each instance, thus it is possible, for example, that the second processor 300 accesses the memory space of the memory 350 which is not needed. In this case, the first processor only has access to the memory 545 or the memory sector 510 of the memory 450. In this case it is possible that the memory element 551 can be eliminated entirely.

What is claimed is:

1. A multi-processor system comprising:
   a memory, said memory including a first section and second section; and
   a first processor and a second processor each coupled with said memory such that said first processor can access said first memory section only in the read mode and said second memory section only in the write mode, and said second processor can access said first memory section only in the write mode and said second memory section only in the read mode, the second processor writing to the first memory section only when the first processor is writing to the second memory section, the second processor reading from the second memory section only when the first processor is reading from the first memory section, thereby preventing a concurrent access of either said first or second memory section by both said first and second processors.

2. The multi-processor system as recited in claim 1, wherein said first processor preforms read, write, and computing operations in an identical sequence as said second processor.

3. The multi-processor system as recited in claim 1, wherein said first and second processors first access said memory in the read mode and then in the write mode.

4. The multi-processor system as recited in claim 1, wherein said first processor is a master processor and is adapted to send an interrupt signal to said second processor, said second processor being a slave processor, said interrupt signal triggering said first and second processors to start a sequence of reading from said memory, writing to said memory, and compute operations.

5. The multi-processor system as recited in claim 4, wherein after said interrupt signal is sent, said first and second processors first access said memory in the read mode and then access said memory in the write mode.

6. The multi-processor system as recited in claim 4, further comprising a first transmission path between said master processor and an internal combustion engine and a second transmission path between said slave processor and said internal combustion engine, said master processor calculating and sending a fuel amount signal to said internal combustion engine via said first transmission path and said slave processor calculating and sending a start injection signal to said internal combustion engine via said second transmission path.

7. The multi-processor system as recited in claim 4, wherein said master processor calculates control signals and said slave processor calculates a fuel amount signal and a start injection signal.

8. The multi-processor system as recited in claim 1, further comprising a first transmission path between said first processor and an internal combustion engine and a second transmission path between said second processor and said internal combustion engine, said first processor calculating and sending a fuel amount signal to said internal combustion engine via said first transmission path and said second processor calculating and sending a start injection signal to said internal combustion engine via said second transmission path.

9. The multi-processor system as recited in claim 1, wherein said first processor calculates control signals and said second processor calculates a fuel amount signal and a start injection signal.

10. The multi-processor system as recited in claim 1, wherein said memory includes further memory sections, the further memory sections being used as an external RAM memory for said first and second processors.

11. A multi-processor system for controlling processes of a motor vehicle, comprising:
    N−1 memories each divided into N sections, where N is an integer >2; and
    N processors coupled with said N−1 memories such that each processor has direct or indirect access to each of the N−1 memories in a read mode and in a write mode, the N memory sections of any of the N−1 memories being accessed by only one of said N processors in the read or write mode at a given time, wherein operations of said N processors are synchronized such that said N processors access said N−1 memories in the same modes at the same time.

12. The multi-processor system as recited in claim 11, wherein said N processors perform read, write and computing operations in an identical sequence.

13. The multi-processor system as recited in claim 12, wherein one of said N processors is a master processor and sends an interrupt signal to the other of said N processors, the other of said N processors are slave processors, wherein said interrupt triggers said N processors to start the identical sequence.

14. The multi-processor system as recited in claim 13, wherein after said interrupt signal triggers said N processors, said N processors first access said N−1 memories in the read mode and then in the write mode.

15. The multi-processor system as recited in claim 13, wherein said master processor calculates control signals, a slave processor calculates a fuel amount signal and a start injection signal, and another slave processor performs tasks associated data input and output.

16. The multi-processor system as recited in claim 11, wherein said N processors first access said N−1 memories in the read mode and then in the write mode.

17. The multi-processor system as recited in claim 11, wherein one of said N processors calculates control signals, and another of said N processors calculates a fuel amount signal and a start injection signal, and yet another of said N processors performs tasks associated with data input and output.

18. The multi-processor system as recited in claim 11, wherein at least one of said memory sections of said N−1 memories that exceed those necessary for data exchange is an external RAM memory for said N processors.

19. A device comprising:
    a) a first processor;
    b) a second processor;
    c) a memory having a first section and a second section;
    d) a first one way data transmission link enabling said first processor to write data to said first section of said memory;

e) a second one way data transmission link enabling said first processor to read data from said second section of said memory;

f) a third one way data transmission link enabling said second processor to write data to said second section of said memory;

g) a fourth one way data transmission link enabling said second processor to read data from said first section of said memory;

h) said second processor reading data from said first section of said memory only when said first processor is reading data from said second section of said memory, said second processor writing data to said second section of said memory only when said first processor is writing data to said first section of said memory.

* * * * *